United States Patent
Pelagatti et al.

(10) Patent No.: US 10,012,146 B2
(45) Date of Patent: Jul. 3, 2018

(54) TURBOJET COMPRISING A BLEEDING SYSTEM FOR BLEEDING AIR IN SAID TURBOJET

(71) Applicant: Airbus Operations (SAS), Toulouse (FR)

(72) Inventors: Olivier Pelagatti, Toulouse (FR); Thomas Deguin, Toulouse (FR); Ronan Bodet, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 561 days.

(21) Appl. No.: 14/623,152

(22) Filed: Feb. 16, 2015

(65) Prior Publication Data
US 2015/0233292 A1 Aug. 20, 2015

(30) Foreign Application Priority Data
Feb. 17, 2014 (FR) ...................................... 14 51234

(51) Int. Cl.
*F02C 6/08* (2006.01)
*F02C 6/06* (2006.01)
(Continued)

(52) U.S. Cl.
CPC ................ *F02C 6/08* (2013.01); *B64D 13/02* (2013.01); *B64D 13/04* (2013.01); *F02C 6/04* (2013.01);
(Continued)

(58) Field of Classification Search
CPC .................... B64D 13/02; B64D 13/04; B64D 2013/0644; B64D 2013/0648; F02C 9/18;
(Continued)

(56) References Cited

U.S. PATENT DOCUMENTS 4,263,786 A * 4/1981 Eng .................... B64D 13/06
62/172
6,189,324 B1 2/2001 Williams et al.
(Continued)

FOREIGN PATENT DOCUMENTS

EP 2476618 7/2012
EP 2476881 7/2012
(Continued)

OTHER PUBLICATIONS

JP411303653A including English-language Abstract.*
French Search Report, dated Dec. 3, 2014.

*Primary Examiner* — Gerald L Sung
*Assistant Examiner* — Scott Walthour
(74) *Attorney, Agent, or Firm* — Greer, Burns & Crain, Ltd.

(57) ABSTRACT

A turbojet comprising a low-pressure compressor, a high-pressure compressor and a bleeding system configured to bleed air in the turbojet and to deliver the air to an air system. The bleeding system comprises a first air intake configured to bleed air at low pressure, a second air intake configured to bleed air at high pressure, a first valve and a second valve having inlets connected to the first air intake, a compressor having an inlet connected to an outlet of the second valve, a high-pressure valve connected to the second air intake, a control valve connected to the air system, and a controller to control opening and closing of the valves depending on a pressure at the first air intake.

8 Claims, 4 Drawing Sheets

(51) Int. Cl.
  *F02C 6/04* (2006.01)
  *B64D 13/04* (2006.01)
  *B64D 13/02* (2006.01)
  *F02C 9/18* (2006.01)
  *F02C 3/10* (2006.01)
  *B64D 13/06* (2006.01)

(52) U.S. Cl.
  CPC ........ *F02C 6/06* (2013.01); *B64D 2013/0644* (2013.01); *B64D 2013/0648* (2013.01); *F02C 3/10* (2013.01); *F02C 9/18* (2013.01)

(58) Field of Classification Search
  CPC ...... F02C 3/10; F02C 6/04; F02C 6/06; F02C 6/08
  See application file for complete search history.

(56) References Cited

U.S. PATENT DOCUMENTS

| | | | | |
|---|---|---|---|---|
| 2012/0045317 | A1* | 2/2012 | Saladino | F02C 6/08 415/145 |
| 2013/0187007 | A1* | 7/2013 | Mackin | F02C 6/08 244/134 R |

FOREIGN PATENT DOCUMENTS

| | | |
|---|---|---|
| EP | 2557038 | 2/2013 |
| JP | 11303653 A * | 11/1999 |

* cited by examiner

TURBOJET COMPRISING A BLEEDING SYSTEM FOR BLEEDING AIR IN SAID TURBOJET

CROSS-REFERENCES TO RELATED APPLICATIONS

This application claims the benefit of the French patent application No. 1451234 filed on Feb. 17, 2014, the entire disclosures of which are incorporated herein by way of reference.

BACKGROUND OF THE INVENTION

The present invention relates to an aircraft turbojet comprising a system for bleeding air from said turbojet, an aircraft comprising at least one such turbojet, and a method for controlling such a turbojet.

FIG. 1 shows an aircraft bypass turbojet 10 equipped with a prior art bleeding system 100 that is intended to bleed air in the turbojet 10 and to deliver said air to an air system 60, such as the conditioned air system 60 of the aircraft cabin.

The turbojet 10 comprises:
- a fan 12 intended to generate a flow of air in the turbojet 10 in a direction of displacement 50 of air in the turbojet, in which case, as is known, the flow of air then moves downstream of the fan in a primary vein of the turbojet 10 or in a secondary vein thereof,
- a compressor 14 that comprises a low-pressure compressor 16 downstream of the fan 12 and a high-pressure compressor 18 arranged downstream of the low-pressure compressor 16,
- a turbine 20 that comprises a high-pressure turbine 22 downstream of the high-pressure compressor 18 and a low-pressure turbine 24 downstream of the high-pressure turbine 22.

The air pushed by the fan and traveling in the primary vein then passes in succession through the low-pressure compressor 16, the high-pressure compressor 18, the high-pressure turbine 22, and the low-pressure turbine 24 so as to be ejected to the outside.

Between the high-pressure compressor 18 and the high-pressure turbine 22, the air passes through a combustion chamber 26.

The high-pressure compressor 18 comprises a plurality of compression stages in which the pressure rises, from upstream to downstream in the direction of displacement 50, from a low pressure at the first stage to a high pressure at the last stage, passing through an intermediate pressure in the vicinity of the middle stage.

The bleeding system 100 comprises:
- a first air intake 102 intended to bleed the air at the intermediate pressure in the high-pressure compressor 18,
- a second air intake 104 intended to bleed the air at high pressure in the high-pressure compressor 18,
- a check valve 106 fluidically connected to the first air intake 102 that prevents the air from moving toward said first air intake 102,
- a high-pressure valve 108 fluidically connected to the second air intake 104 and controlled so as to be open or closed alternatively,
- a control valve 110 intended to control the pressure of the flow of air passing therethrough, the outlet of the high-pressure valve 108 and the outlet of the check valve 106 being fluidically connected to the same inlet of the control valve 110,
- a cooler 112 intended to cool the air passing therethrough, the outlet of the control valve 110 being fluidically connected to an inlet of the cooler 112 and an outlet of the cooler 112 being fluidically connection to the air system 60 of the aircraft,
- a controller 114 intended to control the high-pressure valve 108 and the control valve 110.

The air necessary for the cooling performed in the cooler 112 is bled through a system of pipes 116 arranged downstream of the fan 12 in the secondary air vein of the turbojet 10.

The air pressure at the outlet of the cooler 112 must be compatible with the air pressure that must be injected in the air system 60. In the case of a pressurized cabin, the air pressure typically must be between 137895.14 Pa (20 psia) and 206842.72 Pa (30 psia).

Thus, when the pressure at the first air intake 102 is above a first threshold, typically 275790.29 Pa (40 psia), the air necessary for operation of the bleeding system 100 is bled at the first air intake 102, and when the pressure in the bleeding system 100 is below a second threshold, typically 206842.72 Pa (30 psia), the air necessary for operation of the bleeding system 100 is bled at the second air intake 104.

To this end, a pressure sensor measures the value of the pressure at the first air intake 102 and another pressure sensor 111 measures the value of the pressure in the bleeding system 100. Such a pressure sensor 111 is installed, for example, downstream of the junction between the outlet of the check valve 106 and the outlet of the high-pressure valve 108.

The bleeding system 100 then operates as follows:
- when the pressure at the first air intake 102 is above a first threshold, the controller 114 orders the closure of the high-pressure valve 108,
- the air is then bled at the first air intake 102, passes through the check valve 106 and supplies the control valve 110,
- when the pressure in the bleeding system 100 is below the second threshold, the controller 114 orders the opening of the high-pressure valve 108,
- the air is then bled at the second air intake 104, passes through the high-pressure valve 108 and supplies the control valve 110, and the check valve 106 prevents the air from returning to the turbojet 10,
- the controller 114 controls the control valve 110 in accordance with the air pressure that is to be obtained,
- the air at the outlet of the control valve 110 passes through the cooler 112, then supplies the air system 60.

Such a layout is not always satisfactory in terms of energy consumption.

SUMMARY OF THE INVENTION

One object of the present invention is to propose a turbojet comprising a bleeding system that does not demonstrate the disadvantages of the prior art and that in particular allows a reduction of consumption.

To this end, a turbojet comprising a low-pressure compressor, a high-pressure compressor with a number of compression stages in which the pressure rises, from upstream to downstream in a direction of displacement of the air, from a low pressure to a high pressure, and a bleeding system intended to bleed air in the turbojet and to deliver said air to an air system are proposed, the bleeding system comprising a second air intake intended to bleed air at high pressure in the high-pressure compressor, said bleeding system further comprising
a first air intake intended to bleed air at low pressure,
a first valve of which the inlet is fluidically connected to the first air intake, a second valve of which the inlet is fluidically connected to the first air intake, a compressor of which the inlet is fluidically connected to the outlet of the second valve, a check valve of which the inlet is fluidically connected to the outlet of the first valve and to the outlet of the compressor, and which prevents the air from moving toward the compressor and the first valve, a high-pressure valve fluidically connected to the second air intake, a cooler intended to cool the air passing therethrough, the outlet of the high-pressure valve being fluidically connected to an inlet of the cooler, a control valve intended to control the pressure of the flow of air passing therethrough, the outlet of the cooler and the outlet of the check valve being fluidically connected to the same inlet of the control valve, and an outlet of the control valve being fluidically connected to the air system, a controller intended to control the opening and closing of the high-pressure valve, the first valve, the second valve and the control valve, and a pressure sensor intended to measure the value of the pressure at the first air intake and to transmit information concerning this pressure to the controller.

This particular arrangement makes it possible to reduce the consumption of fuel.

BRIEF DESCRIPTION OF THE DRAWINGS

The features of the invention mentioned above, as well as others, will become clearer upon reading the following description of an exemplary embodiment, said description being provided in conjunction with the accompanying drawings, in which.

DETAILED DESCRIPTION OF THE PREFERRED EMBODIMENTS

Figure 4:
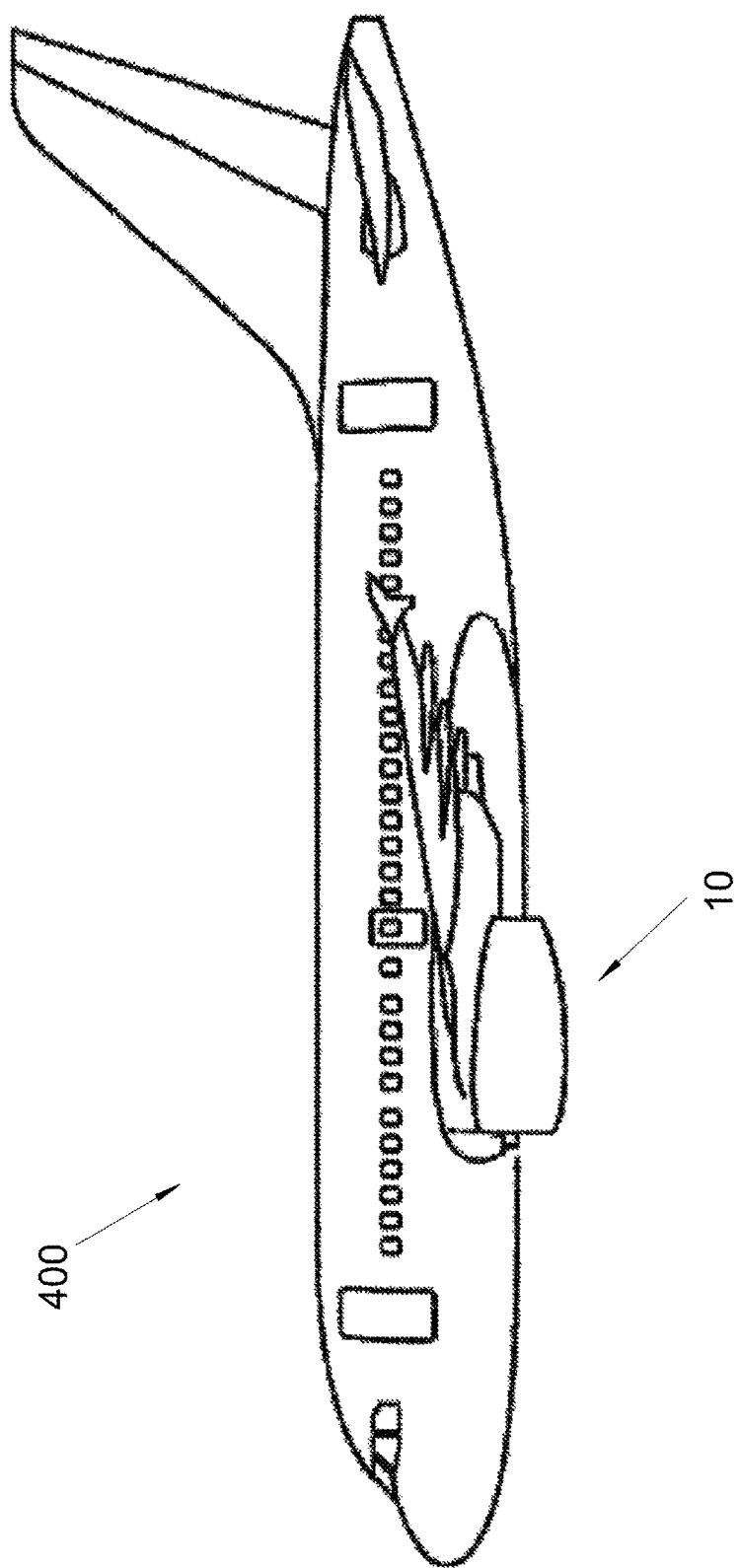
FIG. 4 shows an aircraft comprising a bypass turbojet according to the invention.

FIG. 4 shows an aircraft 400 equipped with a bypass turbojet 10.

Figure 2:
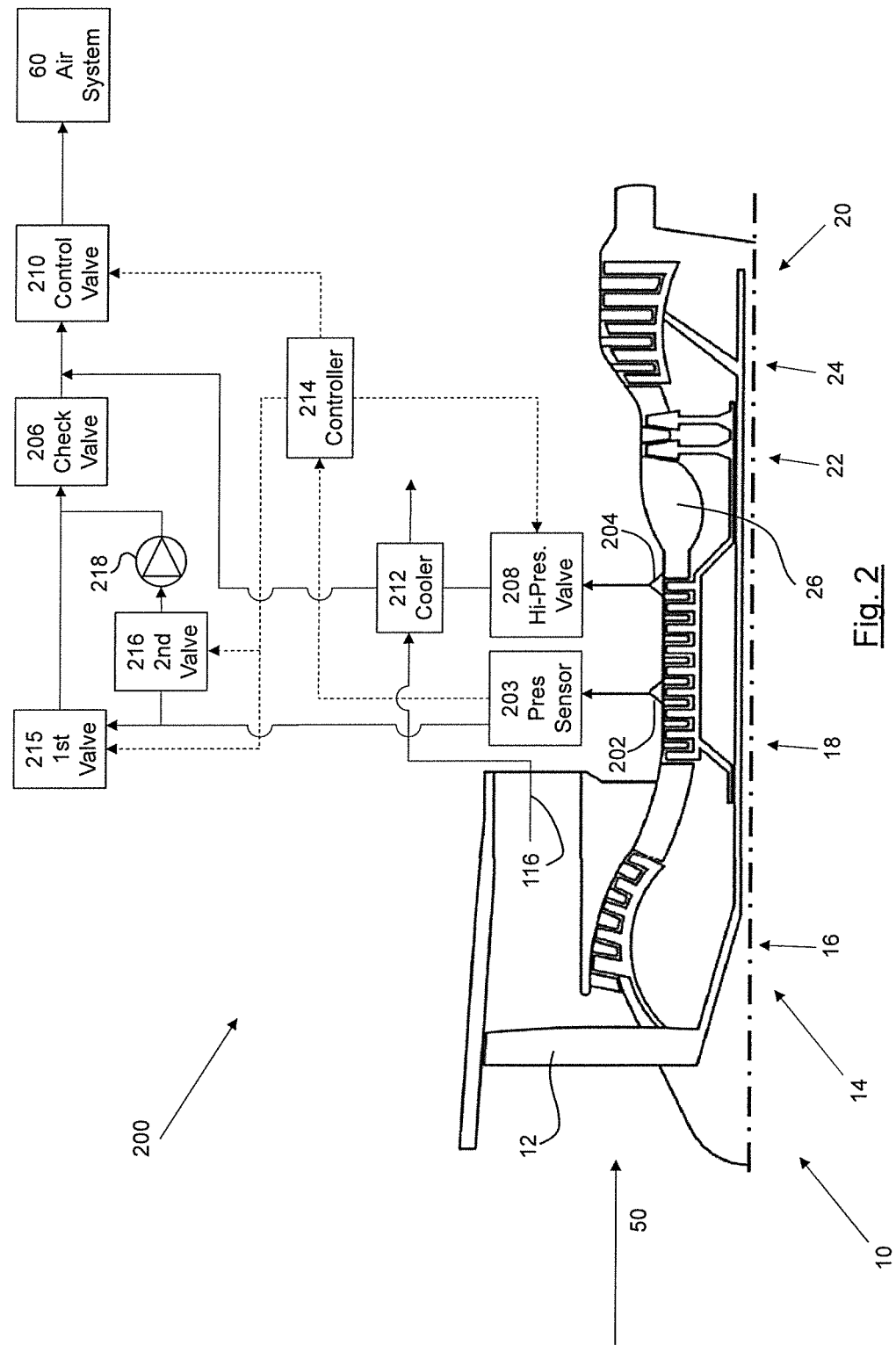
FIG. 2 shows an aircraft bypass turbojet equipped with a bleeding system in accordance with a first embodiment of the invention.
Figure 3:
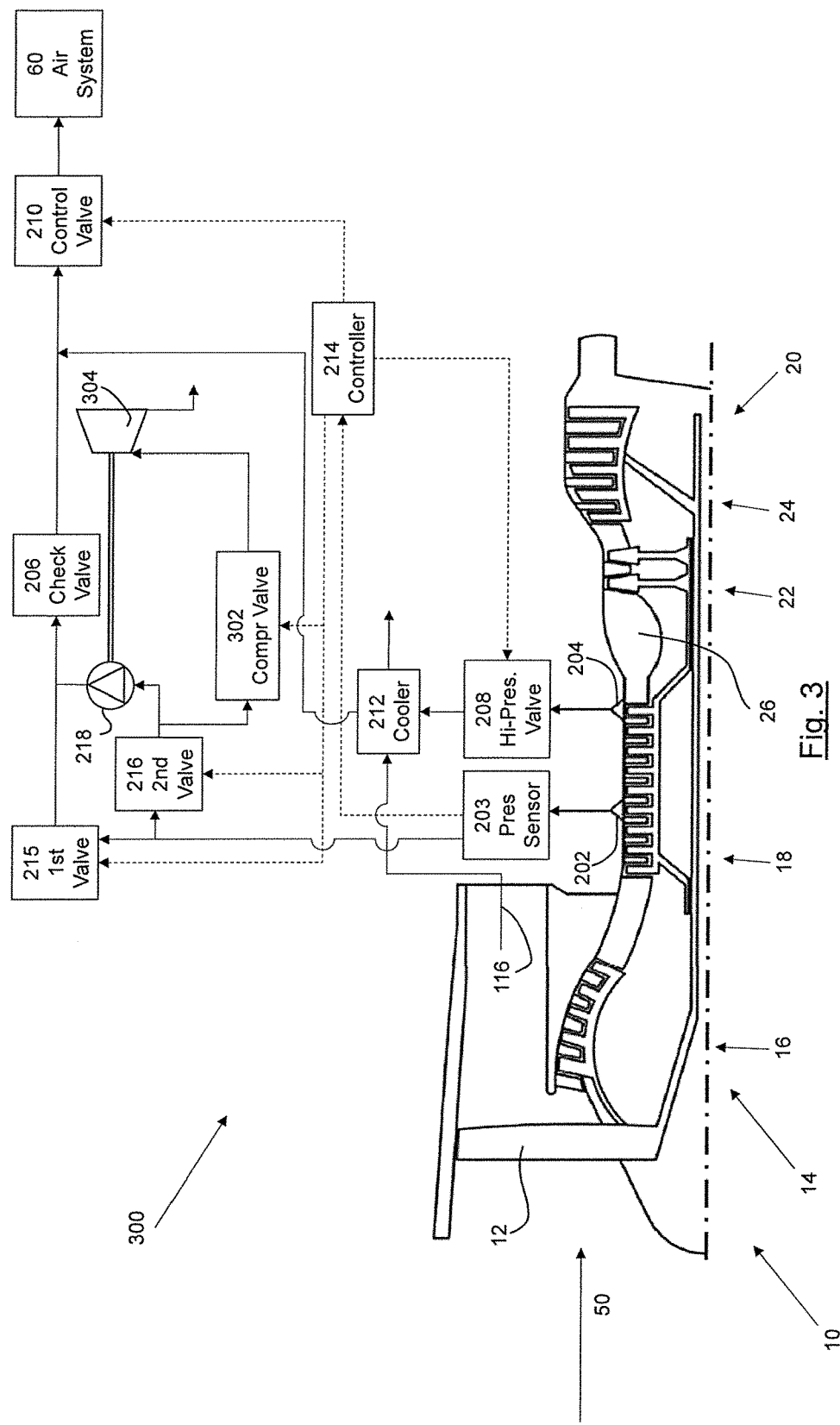
FIG. 3 shows an aircraft bypass turbojet equipped with a bleeding system in accordance with a second embodiment of the invention.

FIG. 2 and FIG. 3 show the turbojet 10 equipped with a bleeding system 200, 300 according to the invention that is intended to bleed air in the turbojet 10 and to deliver said air to an air system 60, such as the conditioned air system 60 of the aircraft cabin.

Figure 1:
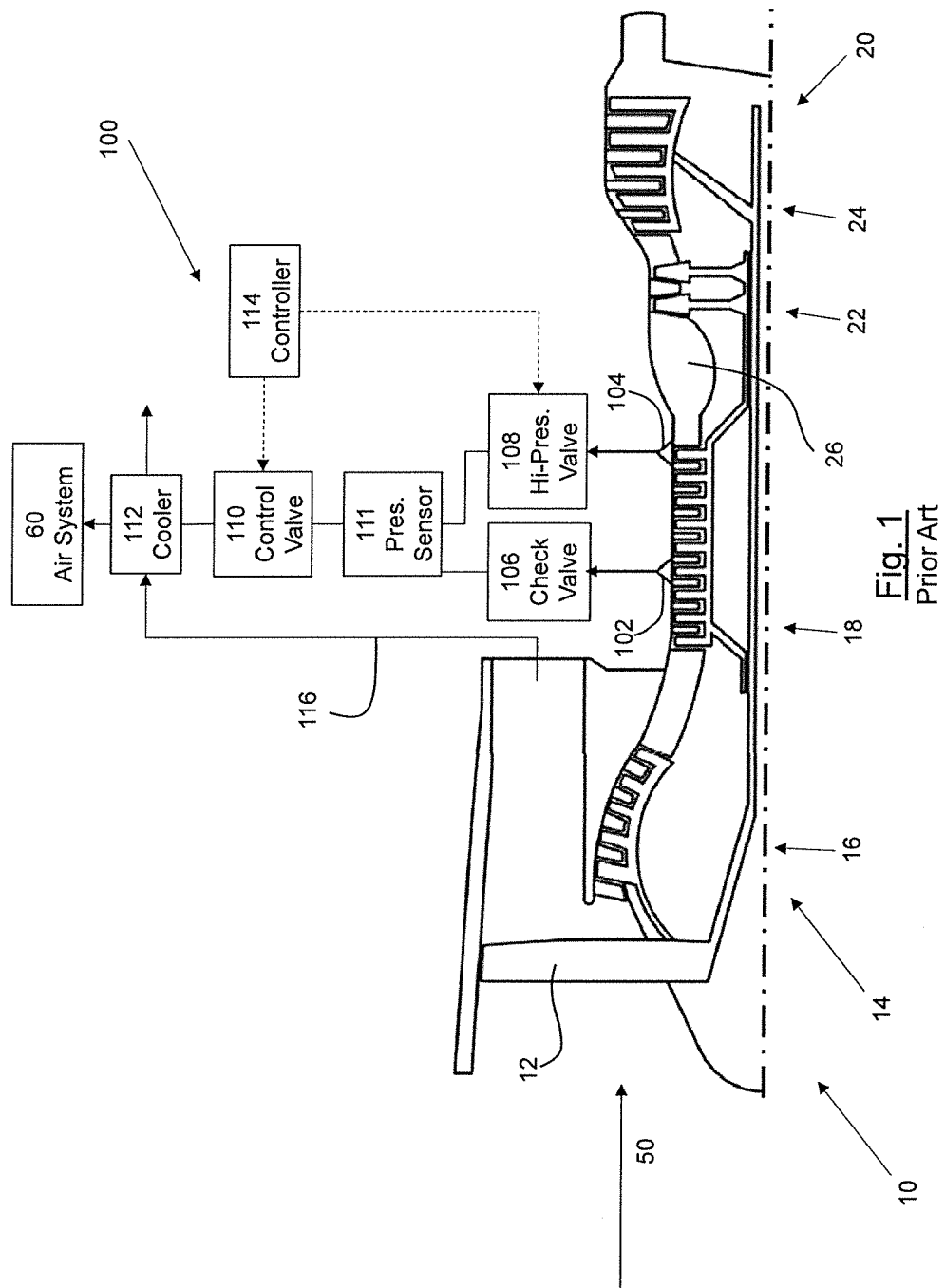
FIG. 1 shows an aircraft bypass turbojet equipped with a bleeding system according to the prior art.

The turbojet 10 comprises the same elements as that in FIG. 1, in particular a low-pressure compressor 16 and a high-pressure compressor 18. These elements bear the same references.

The high-pressure compressor 18 comprises a number of stages of compression in which the pressure rises, from upstream to downstream in a direction of displacement of the air 50 in the turbojet, from a low pressure at the first stage to a high pressure at the last stage.

The bleeding system 200 of FIG. 2 comprises:
a first air intake 202 intended to bleed air at low pressure,
a second air intake 204 intended to bleed air at high pressure in the high-pressure compressor 18,
a first valve 215 of which the inlet is fluidically connected to the first air intake 202, and controlled so as to be open or closed alternatively,
a second valve 216 of which the inlet is fluidically connected to the first air intake 202, and controlled so as to be open or closed alternatively,
a compressor 218 of which the inlet is fluidically connected to the outlet of the second valve 216,
a check valve 206 of which the inlet is fluidically connected to the outlet of the first valve 215 and to the outlet of the compressor 218, and which prevents the air from moving toward the compressor 218 and the first valve 215,
a high-pressure valve 208 fluidically connected to the second air intake 204 and controlled so as to be open or closed alternatively,
a cooler 212 intended to cool the air passing therethrough, the outlet of the high-pressure valve 208 being fluidically connected to an inlet of the cooler 212,
a control valve 210 intended to control the pressure of the flow of air passing therethrough, the outlet of the cooler 212 and the outlet of the check valve 206 being fluidically connected to the same inlet of the control valve 210, and an outlet of the control valve 210 being fluidically connected to the air system 60 of the aircraft, and
a controller 214 intended to control the opening and closing of the high-pressure valve 208, the first valve 215, the second valve 216 and the control valve 210 depending on the pressure at the first air intake 202.

The first air intake 202 is arranged so as to bleed low-pressure air at the low-pressure stages of the high-pressure compressor 18 or at the low-pressure compressor 16.

The air necessary for the cooling performed in the cooler 212 is bled here by means of a system of pipes 116 arranged downstream of the fan 12 in the secondary air vein of the turbojet 10.

The air pressure at the outlet of the control valve 210 must be compatible with the air pressure that must be injected in the air system 60. In the case of a pressurized cabin, the air pressure typically must be between 137895.14 Pa (20 psia) and 206842.72 Pa (30 psia). The controller 214 thus controls the opening of the control valve 210 in accordance with the pressure to be delivered.

Typically, in a turbojet 10 in takeoff mode, the pressure of the air at the first air intake 202, that is to say the low pressure, is approximately 206842.72 Pa (30 psia), and during idling the pressure of the air at the second air intake 204, that is to say the high pressure, is approximately 137895.14 Pa (20 psia).

Thus, when the pressure at the first air intake 202 is above a first threshold, typically approximately 137895.14 Pa (20 psia), the air necessary for operation of the bleeding system 200 is bled at the first air intake 202, when the pressure at the first air intake 202 is below the first threshold and above a second threshold, typically approximately 103421.36 Pa (15 psia), the air necessary for operation of the bleeding system 200 is bled at the first air intake 202 and compressed by the compressor 218, and when the pressure at the first air intake 202 is below the second threshold, the air necessary for operation of the bleeding system 200 is bled at the second air intake 204.

For this purpose, a pressure sensor 203 measures the value of the pressure at the first air intake 202 and transmits the information concerning this pressure to the controller 214 so that said controller controls the opening and closing of the appropriate valves.

Thus, when the pressure at the first air intake 202 is above the first threshold, the controller 214 orders the opening of the first valve 215, the closing of the second valve 216, and the closing of the high-pressure valve 208.

The air coming from the first air intake 202 then passes in succession through the first valve 215, the check valve 206 and the control valve 210 and is guided to the air system 60.

Thus, when the pressure at the first air intake 202 is below the first threshold and above the second threshold, the controller 214 orders the closing of the first valve 215, the opening of the second valve 216, and the closing of the high-pressure valve 208.

The air coming from the first air intake 202 then passes in succession though the second valve 216, the compressor 218, the check valve 206 and the control valve 210 and is guided to the air system 60.

Thus, when the pressure at the first air intake 202 is below the second threshold, the controller 214 orders the closing of the first valve 215, the closing of the second valve 216, and the opening of the high-pressure valve 208.

The air coming from the second air intake 204 then passes in succession through the high-pressure valve 208, the cooler 212 and the control valve 210 and is guided to the air system 60. The check valve 206 then prevents the air coming from the cooler 212 from returning toward the first air intake 202.

A method for controlling the turbojet 10 thus comprises:
- a first control step during which the controller 214 orders the opening of the first valve 215, the closing of the second valve 216, and the closing of the high-pressure valve 208 when the pressure at the first air intake 202 is above the first threshold,
- a second control step during which the controller 214 orders the closing of the first valve 215, the opening of the second valve 216, and the closing of the high-pressure valve 208 when the pressure at the first air intake 202 is below the first threshold and above the second threshold, and
- a third control step during which the controller 214 orders the closing of the first valve 215, the closing of the second valve 216, and the opening of the high-pressure valve 208 when the pressure at the first air intake 202 is below the second threshold.

These three steps are alternative and the controller 214 performs one or the other after having compared the value of the pressure measured by the pressure sensor 203 in relation to the first threshold and the second threshold.

The displacement of the air intake from intermediate pressure to low pressure makes it possible to save fuel during the take-off, ascent and cruising. Depending on the structure of the turbojet 10, the saving can be from 0.7% to 1.7%.

In the embodiment of the invention in FIG. 2, the compressor 218 is driven by an electric power source of the aircraft.

FIG. 3 shows a bleeding system 300 in which the compressor 218 is driven with the aid of a bleed of air performed within said bleeding system 300.

The bleeding system 300 thus also comprises:
- a compression valve 302 of which the inlet is fluidically connected to the outlet of the second valve 216, and
- a turbine 304 of which the inlet is fluidically connected to the outlet of the compression valve 302 and which is intended to drive the compressor 218.

The controller 214 is then also provided in order to control the opening and closing of the compression valve 302.

The operation of the bleeding system 300 is thus identical to that of the first embodiment when the pressure at the first air intake 202 is above the first threshold and when the pressure at the first air intake 202 is below the second threshold. The controller 214 thus orders the closing of the compression valve 302.

By contrast, when the pressure at the first air intake 202 is below the first threshold and above the second threshold, the controller 214 orders the closing of the first valve 215, the opening of the second valve 216, the closing of the high-pressure valve 208 and the opening of the compression valve 302.

During the second control step, the controller 214 also orders the opening of the compression valve 302.

The air coming from the first air intake 202 then passes in succession through the second valve 216, the compressor 218, the check valve 206 and the control valve 210 and is guided to the air system 60, whereas some of the air is bled at the outlet of the second valve 216 in order to pass through the compression valve 302 and then supply the turbine 304.

The controller 214 orders the opening of the compression valve 302 in order to distribute the air between the compressor 218 and the turbine 304. In accordance with one particular embodiment, 66% of the air coming from the second valve 216 passes through the compressor 218 and 33% passes through the turbine 304.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbojet comprising:
   a low-pressure compressor,
   a high-pressure compressor with a plurality of compression stages in which a pressure rises, from upstream to downstream in a direction of displacement of a flow of air, from a low pressure to a high pressure, and
   a bleeding system configured to bleed air in the turbojet and to deliver said bled air to an air system, the bleeding system comprising:
   a first air intake configured to bleed low-pressure air,
   a second air intake configured to bleed high-pressure air in the high-pressure compressor,
   a first valve having an inlet fluidically connected to the first air intake,
   a second valve having an inlet fluidically connected to the first air intake, a third compressor having an inlet fluidically connected to an outlet of the second valve, a check valve having an inlet fluidically connected to an outlet of the first valve and to an outlet of the third compressor, and which prevents air from moving toward the third compressor and the first valve, a high-pressure valve fluidically connected to the second air intake, a cooler configured to cool air passing therethrough, an outlet of the high-pressure valve fluidically connected to an inlet of the cooler, a control valve configured to control a pressure of air passing therethrough, an outlet of the cooler and an outlet of the check valve each fluidically connected to an inlet of the control valve, and an outlet of the control valve fluidically connected to the air system, a controller configured to control an opening and a closing of the high-pressure valve, the first valve, the second valve and the control valve, and a pressure sensor configured to measure a pressure value at the first air intake and to transmit information concerning the pressure value to the controller, wherein the opening and the closing of the high-pressure valve, the first valve, the second valve and the control valve depends on the pressure value measured at the first air intake, and wherein the inlet of the control valve is configured to receive air from one of the outlet of the first valve and the outlet of the third compressor, depending on the opening and the closing of each of the high-pressure valve, the first valve, and the second valve.

2. The turbojet as claimed in claim 1, wherein the first air intake is configured to bleed low-pressure air at a plurality of low-pressure stages of the high-pressure compressor.

3. The turbojet as claimed in 1, wherein the bleeding system further comprises:

a compression valve having an inlet fluidically connected to the outlet of the second valve, and a turbine having an inlet fluidically connected to an outlet of the compression valve and configured to drive the third compressor, the controller configured to control an opening and a closing of the compression valve.

4. An aircraft comprising the turbojet as claimed in claim 1.

5. A method for controlling the turbojet as claimed in claim 1, the control method comprising:

a first control step during which the controller orders the opening of the first valve, the closing of the second valve, and the closing of the high-pressure valve when the pressure at the first air intake is above a first threshold, a second control step during which the controller orders the closing of the first valve, the opening of the second valve, and the closing of the high-pressure valve when the pressure at the first air intake is below the first threshold and above a second threshold, and a third control step during which the controller orders the closing of the first valve, the closing of the second valve, and the opening of the high-pressure valve when the pressure at the first air intake is below the second threshold.

6. The method as claimed in claim 5, the turbojet further comprising a compression valve and a turbine, and the controller ordering an opening of the compression valve during the second control step.

7. The method as claimed in claim 5, wherein the first threshold is approximately 20 psia.

8. The method as claimed in claim 5, wherein the second threshold is approximately 15 psia.

* * * * *